Dec. 28, 1926.
P. A. WELLS ET AL
ROAD METER
Filed Oct. 3, 1925
1,612,407
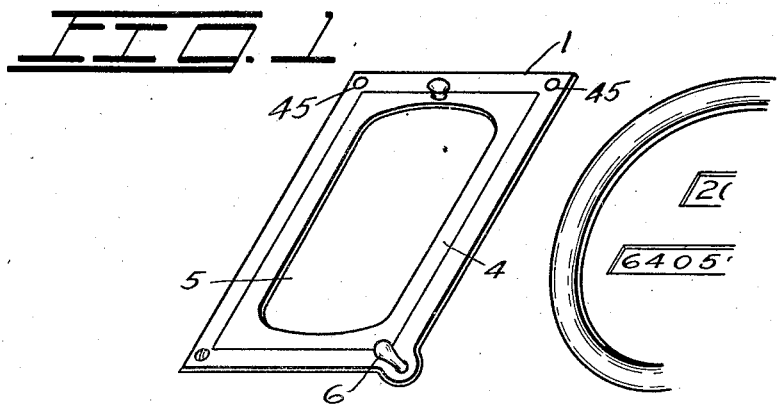
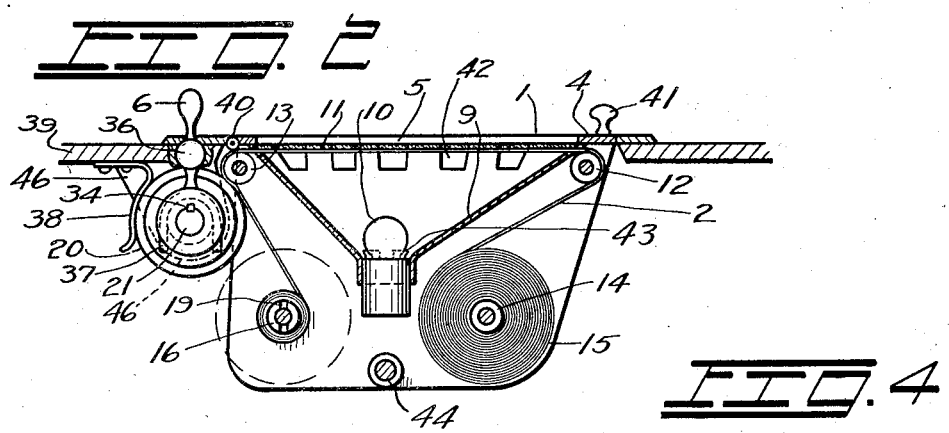
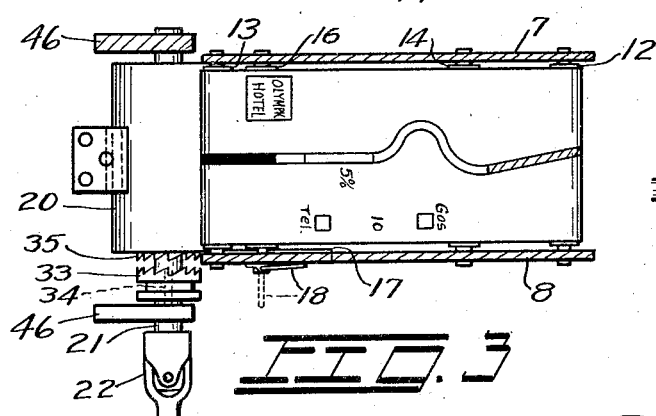
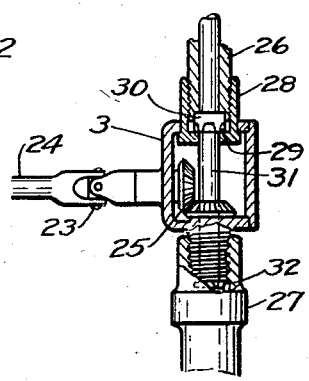
INVENTORS
Paul A. Wells
Dean S. Norton
Harry Bowen
ATTORNEY Patented Dec. 28, 1926.

1,612,407

UNITED STATES PATENT OFFICE.

PAUL A. WELLS AND DEAN S. NORTON, OF SEATTLE, WASHINGTON.

ROAD METER.

Application filed October 3, 1925. Serial No. 60,322.

The invention is a device that may be inserted in the instrument board of a motor vehicle to display a portion of the roadway over which the vehicle is traveling.

The object of the invention is to provide a device for automatically displaying a portion of the roadway over which a motor vehicle is traveling.

Another object of the invention is to provide a means for operating a tape having the map of a road printed thereon so that a predetermined amount of the road ahead of the vehicle will be visible continuously.

And a further object of the invention is to provide a means for displaying a map of a road over which a motor vehicle is traveling which is of a simple and economical construction.

With these ends in view the invention embodies a frame that may readily be inserted in the instrument board of a motor vehicle, means for supporting spools of tape in the said frame, means for causing the said tape to move as the vehicle moves, a lever for stopping and starting the said tape and a lamp for illuminating the said tape.

Other features and advantages of the invention, will appear from the following description, taken in connection with the drawings, wherein:—

Figure 1 is a view showing the device as it would appear in place.

Figure 2 is a longitudinal section.

Figure 3 is a plan view with the cover of the frame omitted.

Figure 4 is a detail showing the power take-off from the speedometer cable.

Figure 5 is a detail view showing the spring and casing.

In the drawings we have shown our device as it would be made wherein numeral 1 indicates the frame, numeral 2 the tape and numeral 3 the power take-off casing.

The frame 1 may be rectangular shaped as shown in Figure 1 or of any suitable design. In the center of the frame is a cover 4 with an opening 5 in it and in the lower part of the frame is a lever 6 for operating a part clutch. At the sides of the cover 4 are side plates 7 and 8 in which the rollers supporting the tape are mounted, and under the central portion of the cover is a reflector 9 having a lamp 10 in it which will illuminate the tape. Below the opening 5 is a glass 11 and at the ends of the glass are rollers 12 and 13 around which the tape passes. In the upper end of the frame is a roller 14 upon which a spool 15 of tape containing a map of the route over which a vehicle is about to travel and the tape passes from this spool around a roller 12, along the under side of the glass, and around the roller 13 to the roller 16 upon which it will be wound. The roller 16 is provided with a casing 17 at one end having a clock spring 17$^a$ in it with a foldable handle 18 by which the spring may be wound by rotating the roller 16. It will be observed that the roller 16 has a notch 19 in one end into which a key from the spring may project so that the roller may be removed and replaced in a manner similar to that of the film roller of a camera. It will be observed that normally the spring would tend to roll the tape upon the roller 16. However when in the position shown the tape will be held by a friction roller 20 that engages the roller 13 and that is provided with a rubber covering. The roller 20 is mounted upon a shaft 21 and the shaft 21 rotates with the speedometer cable through the universal joints 22 and 23, the rod 24 and the gears 25 in the casing 3. It will be observed that the casing 3 may readily be set between the nipple 26 that projects below the speedometer and the connection 27 at the end of the speedometer cable. The casing 3 is provided with a rotatable sleeve 28 which is similar to the connection 27 and has a socket 29 therein to engage the member 30 of the speedometer shaft. The socket 29 is mounted upon a shaft 31 and at the opposite end of the shaft is a member 32 which is similar to the member 30 so that the socket of the speedometer cable in the connection 27 will engage it and cause the shaft 31 upon which the beveled gear is mounted to rotate as the speedometer rotates. It will be seen that the shaft 21 will thereby normally rotate and as the clutch member 33 is keyed to it by key 34 this member will also normally rotate; and when the clutch member 33 is thrown into engagement with the clutch member 35 at the end of the roller 20 by operating the lever 6, the roller 20 will also rotate and move the tape so that it will be wound upon the roller 16. It will be observed that the ratio between the gears 25 and the size of the roller 20 may be adjusted so that the tape will move at exactly the same speed as the vehicle is traveling.

The lever 6 is provided with a ball joint 36 which has a yoke 37 extending below it and it will be observed that as the lever is moved from one side to the other it will cause the yoke to operate the clutch. A spring 38 may be attached to the under side of the instrument board, which is indicated by the numeral 39, and this spring may bear against the roller 20 to prevent its rotating except when the clutch is thrown into engagement.

The cover 4 is hinged to the frame 1 by hinges 40 and is provided with a knob 41 by which it may be readily raised to change the spools of tape. The reflector 9 may be provided with openings 42 along the upper edge and other openings 43 around the lamp to permit circulation to prevent the lamp overheating the tape. A cross tie 44 may be provided between the lower edges of the plates 7 and 8 to hold them in their proper positions if desired. The frame 1 may be provided with screws 45 to hold it to the instrument board, however it is understood that it may be held in any suitable manner. The roller 20 may be supported by brackets 46 from the under side of the instrument board as shown.

The construction will be readily understood from the foregoing description. To use the device it may be installed on the instrument board of a motor vehicle and connected to the speedometer cable as shown and described and it will be observed that the tape which may readily be removed and replaced will automatically operate with the vehicle and always show a section of the roadway ahead of the point at which the vehicle is traveling.

The tape may be arranged to show an outline of the roadway, the condition of the roadbed, the curves and grades and any desired information such as advertising or location of stores, filling stations, or telephones.

Having thus fully described the invention, what we claim as new and desire to secure by Letters Patent, is:—

In a road meter, a plate that may readily be inserted in the instrument board of a motor vehicle, another plate forming a frame for the said former plate and to which the said former plate is hinged, said former plate having an opening in the central portion thereof, a knob on the said former plate by which it may be raised, side plates extending downward from the said former plate, a transparent cover on the underside of the said opening, small rollers rotatably mounted in the said side plates and directly below the said transparent cover, a storage roller rotatably mounted between the said side plates upon which a roll of tape may be placed, another roller between the said side plates upon which the said tape may be wound, a means for rotating the said latter or winding roller, illuminating means below the said transparent cover, another roller having a slightly resilient surface engaging one of the small rollers below the transparent cover and adjacent the said winding roller, brackets that may be attached to the under side of the said instrument board for supporting the said roller with the resilient surface, a clutch at the end of the said resilient roller, means for operating the said clutch from the face of the instrument board, a suitable connection between the said clutch and the speedometer shaft, and a tape on the said storage and winding rollers showing an outline of a roadway, conditions of the road bed, curves, grades, advertising matter, and any other information regarding the road.

PAUL A. WELLS.
DEAN S. NORTON.